US007892341B1

(12) United States Patent
Lalgudi et al.

(10) Patent No.: US 7,892,341 B1
(45) Date of Patent: Feb. 22, 2011

(54) COMPOSITION

(76) Inventors: Ramanathan S Lalgudi, 8014 Lazelle Woods Dr., Westerville, OH (US) 43081; Rob J. Cain, 5865 Leeward Ct., Lewis Center, OH (US) 43035

( * ) Notice: Subject to any disclaimer, the term of this patent is extended or adjusted under 35 U.S.C. 154(b) by 0 days.

(21) Appl. No.: 12/550,937

(22) Filed: Aug. 31, 2009

(51) Int. Cl.
*C09K 3/00* (2006.01)

(52) U.S. Cl. .......................................... 106/34; 442/91

(58) Field of Classification Search .................. 106/34; 442/91, 93, 94
See application file for complete search history.

(56) References Cited

U.S. PATENT DOCUMENTS

2009/0069212 A1 * 3/2009 Burgess et al. .............. 510/519

* cited by examiner

*Primary Examiner*—Arti Singh-Pandey
(74) *Attorney, Agent, or Firm*—Norris McLaughlin & Marcus, PA

(57) ABSTRACT

A stain repellent composition comprising a cellulose based compound which has been modified hydrophobically.

8 Claims, No Drawings

COMPOSITION

The present invention relates to a stain repellent composition.

Stain repellent compositions are well known. Their use can either be temporary or more permanent.

In most cases stain repellent are based upon fluorine containing polymers or silicones, due to their low surface energies. However, this low surface energy (which provides good stain repellence) also provides a disadvantage in that these materials pose adherence issues to the surfaces to which they are applied.

Furthermore the high hydrophobicity of these materials also means that creating a water based application matrix is difficult/impossible.

It is an object of the present invention to obviate/mitigate the problems outlined above.

According to a first aspect of the invention there is provided a stain repellent composition comprising a cellulose based compound which has been modified hydrophobically.

The stain repellents of the invention have been found to have excellent properties. Amongst these advantages are excellent adhesion to substrates and a compatibility with both aqueous and non-aqueous systems.

Preferably the cellulose based compound comprises starch including modified, e.g. cationic starch, alginic acid, cyclodextrin or an admixture thereof.

Preferably the hydrophobic modifying process comprises the grafting of a hydrophobic moiety on the cellulose based compound. Preferred examples of hydrophobic moieties include epoxy functional silicones and fluorinated diols.

It has been found that the stain repellent so the invention typically has a molecular weight of from $3\times10^2$ to $3\times10^6$ Dalton units.

According to a second aspect of the invention there is provided a method of applying the stain repellents of the first aspect of the invention to a substrate.

It has been found that the binding affinity of the stain repellents of the invention is excellent and to be >0.5 kCal/mol.

Preferably the stain repellent is applied in an automatic washing process (most preferably an automatic laundry washing process). Thus preferably the substrate comprises a fabric material, e.g. such as an item of clothing.

The stain repellent may be applied to other materials in other application processes, e.g. to carpets, glasses, furniture, paper, shoes, vehicle components (e.g. decking, leather, metal/painted metal surfaces).

According to a third aspect of the invention there is provided a textile material treated in accordance with the second aspect of the invention.

The invention will now be illustrated with reference to the following non-limiting Examples.

EXAMPLE 1

Modification of Alginic Acid with an Epoxy Silicone

The following ingredients were added to a 250 mlround bottomed flask:

20.28 g of Alginic acid,
2.06 g $K_2CO_3$,
65 ml DMAC, and
65 ml anhydrous toluene.

The flask was heated to 90° C. over 2 hours whilst being purged with argon.

8.26 g of epoxy polydimethyl silicone was added and the mixture was mixed overnight.

The resultant dark tan solids were dried under vacuum.

EXAMPLE 2

Modification of Cyclodextrin with an Epoxy Silicone

The procedure of Example 1 was followed with the exception that 3.08 g cyclodextrin was used (instead of the alginic acid) and 10.2 epoxy polydimethyl silicone was added.

EXAMPLE 3

Modification of Alginic Acid with an Fluorinated Diol

The procedure of Example 1 was followed with the exception that 54 g of a Fluorinated Diol (Omnova Lot 2234AM38) was used (instead of the silicone).

EXAMPLE 4

Modification of Aspartic Acid with an Fluorinated Diol

The procedure of Example 3 was followed with the exception that 1.5 g of aspartic acid was used (instead of the alginic acid), and 17.05 g of a Fluorinated Diol (Omnova Lot 2234AM38) was used.

EXAMPLE 5

Modification of Cationic Starch with an Epoxy Silicone/Blend/Tegotop

The following ingredients were together:

1 g of Cationic Starch (CELQUAT® L-200),
5 g water,
and mixed at 3000 rpm for 5 seconds. Followed by the addition of:
0.25 g of epoxy polydimethyl silicone,
0.25 g of TEGOTOP® 210 (modified nanoparticles in silicone fluid)
and mixed at 3000 rpm for 5 seconds.

The resultant mixture was a transparent paste.

EXAMPLE 6

Modification of Cationic Starch with an Epoxy Silicone

The procedure of Example 1 was used with the following ingredients:

3.05 g Cationic Starch (Celquat L-200),
10.01 g epoxy polydimethyl silicone,
5.67 g $K_2CO_3$,
65 ml DMAC, and
50 ml anhydrous toluene.

The invention claimed is:

1. A stain repellent composition which comprises a hydrophilically modified cellulose based compound having a grafted-hydrophobic moiety.

2. A stain repellent composition according to claim 1, wherein the hydrophilically modified cellulose based compound comprises starch, alginic acid, cyclodextrin or an admixture thereof.

3. A stain repellent composition according to claim 2, wherein the cellulose based compound comprises a cationic starch.

4. A stain repellent composition according to claim 1, wherein the hydrophobic moiety include epoxy functional silicones and fluorinated diols.

5. A method of applying a stain repellent composition according to claim 1 to a substrate, comprising the step of applying the stain repellent composition to the substrate.

6. A method according to claim 5, wherein the stain repellent composition is applied in an automatic washing process.

7. A method according to claim 5 wherein the substrate comprises a fabric material.

8. A textile material comprising the stain repellent composition according to claim 1.

* * * * *